May 20, 1958   J. D. D'IANNI ET AL   2,835,645
HIGH STYRENE-LOW DIENE RESINS OF HIGH HEAT SOFTENING POINT
Filed Jan. 5, 1955

INVENTORS
JAMES D. D'IANNI
HAROLD S. SELL
BY
R. L. Miller
ATTORNEY

United States Patent Office 2,835,645
Patented May 20, 1958

2,835,645

HIGH STYRENE-LOW DIENE RESINS OF HIGH HEAT SOFTENING POINT

James D. D'Ianni, Akron, and Harold S. Sell, Cuyahoga Falls, Ohio, assignors to The Goodyear Tire & Rubber Company, Akron, Ohio, a corporation of Ohio Application January 5, 1955, Serial No. 479,928

6 Claims. (Cl. 260—45.5)

This invention relates to a new composition of matter, particularly to a high heat distortion point resinous composition resulting from the polymerization of a conjugated diene monomer in the presence of a vinyl aromatic polymer composition resulting from the polymerization of at least 40 parts and not more than 90% of the total vinyl aromatic monomer used in the resin.

Heretofore the resinous copolymers resulting from the polymerization of a mixture of styrene and butadiene all possessed a heat distortion point below about 170° F. when about 5 parts of butadiene were used in combination with about 95 parts of styrene. When 10 parts of butadiene were used in combination with 90 parts of styrene, the heat softening point dropped below 155° F. and continued to drop rapidly as the higher butadiene resins were made.

It would be of considerable value to the resin industry if the heat distortion point of these copolymers could be raised to approach that for polystyrene which has a value of about 210° F., without these copolymers becoming brittle. When more butadiene is polymerized with the styrene in an effort to reduce the brittleness, the softening point is also reduced and, in most cases, to a considerable degree. An ideal resin would be one which possesses a relatively high resistance to impact while at the same time having a heat distortion point above 170° F.

It now has been discovered that the heat distortion point of a polymeric resin of butadiene and styrene can be raised considerably and the resistance to impact improved when the butadiene is polymerized in the presence of a styrene composition resulting from the polymerization of about 40 parts to not more than 90% of the total styrene used in the finished resin.

Figure 1:
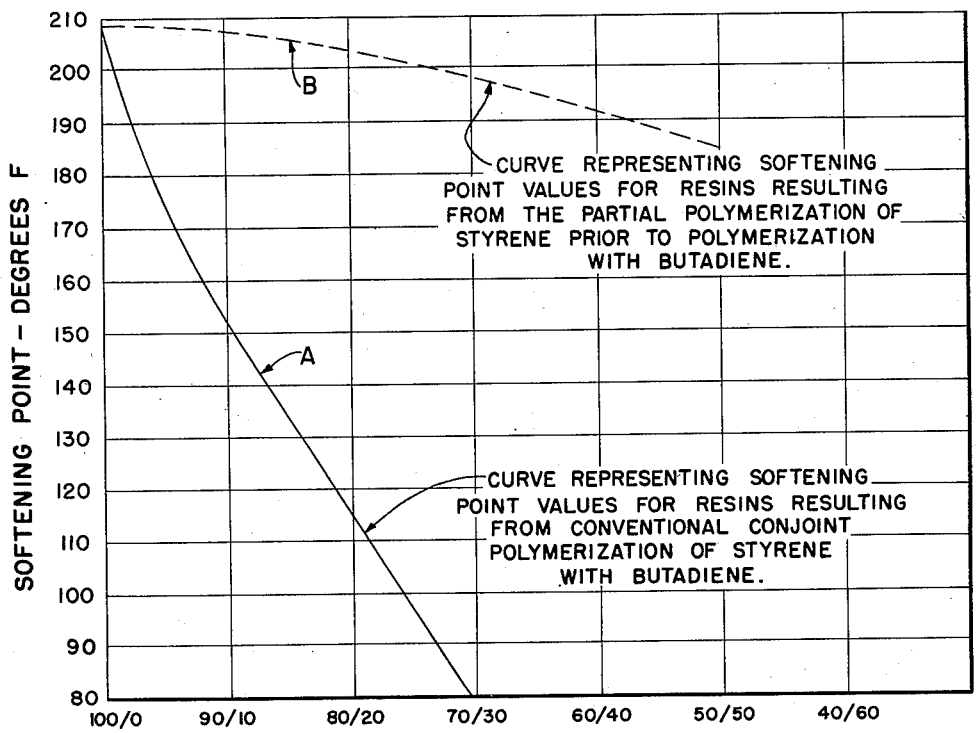
Figure 2:
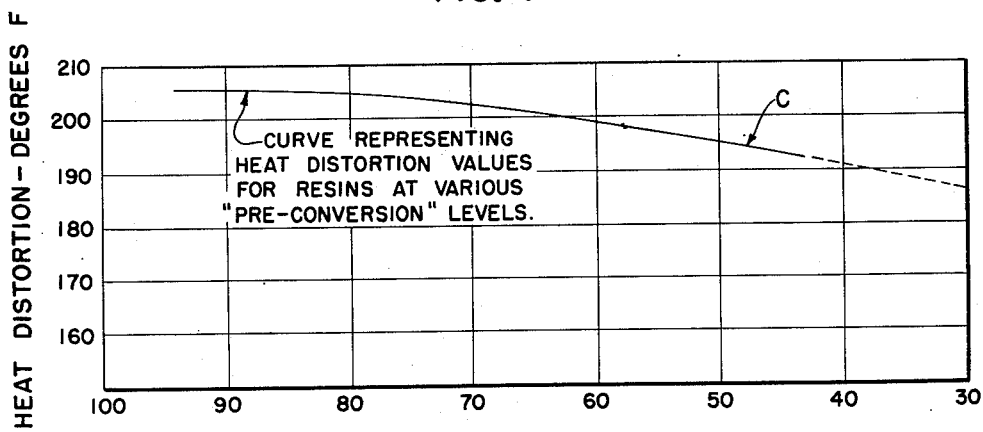

The temperature at which a polymeric resin of butadiene and styrene will distort under pressure depends on the manner in which it is made and is clearly set forth in the drawing by the various curves shown. Fig. 1 shows two curves each representing the heat softening point value for resins which in the case of curve A result from the conventional conjoint polymerization of styrene with butadiene and which in the case of curve B result from the partial polymerization of the total styrene prior to polymerization with butadiene. Fig. 2 shows curve C which represents the heat distortion values for resins resulting from the polymerization of butadiene in the presence of a polymeric styrene composition resulting from the partial polymerization of the styrene ranging from at least 40 parts to not more than 90% of the total styrene used in preparing the resin in which from 55 to 95 parts of styrene and from 45 to 5 parts of butadiene may be used based on 100 parts of total monomers.

The following Table I shows the amount of styrene in percent to be converted to polystyrene for each of the resins made using from 55 to 95 parts of styrene and from 45 to 5 parts of butadiene when the minimum of at least 40 parts of the styrene is to be polymerized prior to polymerization with the butadiene. The table also shows the amount of styrene in parts to be converted to polystyrene for each of the resins listed when a maximum of 90% of the styrene is to be polymerized prior to polymerization with the butadiene:

Table I

| Styrene/Butadiene Resin Ratio | 40 Parts of Styrene Content expressed in percent | 90% of Styrene Content expressed as parts |
|---|---|---|
| 55/45 | 72.5 | 49.5 |
| 60/40 | 66.7 | 54.5 |
| 65/35 | 61.4 | 58.5 |
| 70/30 | 57 | 63 |
| 75/25 | 53.3 | 67.5 |
| 80/20 | 50 | 72 |
| 85/15 | 47 | 76.5 |
| 90/10 | 44.3 | 81 |
| 95/5 | 42 | 85.5 |

Each of the values used in establishing curves B and C of the drawing are those of resins which were made in accordance with the following general procedure:

A reactor, preferably a glass-lined reactor, was closed and purged of air, then charged with a buffer solution of sodium hydroxide, a catalyst, such as potassium persulfate, and a soap, such as a disproportionated rosin acid consisting essentially of the dehydro- and the dihydro abietic acids. A modifier, such as dodecyl mercaptan was then dissolved in the total styrene used in making the resin and added to the buffer solution in the reactor. The reactor was then heated and agitated until the styrene became polymerized to the value desired, which was from a value of at least 40 parts to a value of not more than 90%. After the styrene had been polymerized to the value desired, the butadiene was charged to the reactor and heating continued until the butadiene had been completely polymerized. The resulting latex was discharged and antioxidant in dispersion form was added to protect the polymer from oxidation. The product was isolated by coagulation with dilute acid solution, filtered, washed and dried. Instead of coagulating the latex, it may be dried by spraying into a heated chamber to flash off the water, leaving small resin particles behind. The heat distortion point of the resin was determined by the ASTM method identified as D648–45T, using a deflection pressure of 66 pounds per sq. in. Specifically, the heat distortion point is measured by molding the resin to be tested into a ½" x ½" x 5" bar. The bar is then supported adjacent its opposite ends on metal supports spaced 4" apart and a deflection pressure of 66 pounds per sq. in. is applied at the center of the supported bar while the temperature of the resin is raised at the rate of 2° C. per minute until the bar has sagged or distorted to a point 0.010 inch below the horizontal. At this position of the bar, the temperature of the bar is read and this temperature is the heat distortion temperature of the resin.

The heat softening point of the resins of curves A and B was determined by heating a moisture-free strip of the resin 1" x 3" x .075" in a 50% ethylene glycol water solution. The strip is supported on two stainless steel rods spaced 2" apart and located 1 inch below the level of the solution. A weight plunger provided with a slightly beveled bearing surface is caused to rest on the center portion of the supported strip. The temperature of the solution is raised at the rate of 1° C. per minute. The plunger is freely supported within a glass tube provided with marks ½" apart vertically on the tube. A mark on the plunger is brought even with the top mark on the tube as the plunger rests on the sample. A temperature reading is taken at the moment the plunger mark moves downwardly away from the top mark on the glass tube and another reading is taken when the same plunger mark is opposite the lower mark on the glass tube. The average of these two readings is the softening point of the resin.

One of the resins of curve C in Fig. 2 was made in accordance with the general procedure outlined above, in which a buffer solution was first made, comprising 180 parts of water, 5 parts of a soap known as Sodium Dresinate, being a disproportionated rosin acid consisting essentially of the dehydro- and the dihydro-abietic acids, .3 part of potassium persulfate, and .05 part of sodium hydroxide. To this buffer solution was added 75 parts of styrene plus .125 parts of n-dodecyl mercaptan and the mixture reacted at 110° F. until 85% of the styrene was converted to polystyrene. Twenty-five parts of butadiene was then added to the reaction mixture and this mixture was then heated at 135° F. until the solids content remained constant. The resulting latex was discharged and 1.5 parts of phenyl beta naphthylamine was added as an antioxidant. The latex was coagulated by adding a 2% solution of hydrochloric acid in amount sufficient to neutralize the soap. The coagulant was recovered by filtration, washed with water and spray dried to flash off the water. All parts used being per 100 parts of monomers reacted.

The conventional copolymer resins of curve A were made under the same conditions as were used in making the resins of curve B with the exception that the styrene monomer component and the butadiene monomer component were copolymerized together in the reactor.

From an examination of these two curves A and B, it is surprising to note that a 70/30 styrene/butadiene conventional copolymer resin is almost rubber-like in properties, having a heat softening point of about 80° F., whereas the preconversion resin containing 20 parts more of butadiene and 20 parts less of styrene than the 70/30 styrene/butadiene conventional copolymer has a heat softening point even higher than the heat softening point possessed by the 95/5 conventional copolymer resin, the specific values being 195° F. for the preconversion resin containing 50 parts of butadiene, and only 177° F. for the conventional copolymer resin containing only 5 parts of butadiene. Curve A establishes the fact that the heat softening point of a conventional copolymer resin decreases sharply as the styrene portion of the polymer is reduced, whereas in the the preconversion resin of this invention the heat softening point is relatively independent of the styrene content, the heat softening value remaining well above 180° F. for all values of styrene content ranging from 50 parts to 95 parts.

The importance of converting at least 40 parts of the total styrene to polystyrene before the butadiene is polymerized in the presence of the polystyrene latex resulting from this preconversion, is to be observed in the following Table II showing the heat distortion values possessed by, for example, a 90/10 styrene/butadiene resin when less than 40 parts of the styrene component was prepolymerized before polymerization with butadiene in making the final resin:

Table II

| Styrene/Butadiene Resin Ratio | Parts of Total Styrene Converted to Polystyrene | Heat Distortion of final resin, °F. |
|---|---|---|
| 90/10 | 21.6 | 96 |
| 90/10 | 33.3 | 161 |

Similar low heat distortion values are obtained with the other resins having varying amounts of styrene/butadiene ratios ranging from 90/10 down to 55/45.

The importance of not carrying out the preconversion of the styrene component of the resin to a value greater than 90% is to be seen in regard to the impact strength of either the uncured resin or a cured blend of the resin with a rubber. The following table III shows a series of cured resin/rubber blends using 75 parts of resin and 25 parts of rubber and a resin in which the preconversion value of the styrene component in two instances was above 90%. The resin used in these blends was made in the same manner hereinbefore described for the preconversion resins and was blended with a GR-S rubber in a conventional manner in which the resin was first milled at a temperature approximately 50° higher than the heat softening point of the resin, and the rubber slowly added to the band of resin on the mill until homogeneously dispersed, after which 3 to 5 parts of zinc oxide, 1.5 to 2 parts of an accelerator, such as mercaptobenzothiazole disulfide, and 2 parts of sulfur were added and homogeneously mixed into the blend of the resin and the rubber. The resulting blend was cured into bars ½" square by 5" long and tested for resistance to impact in accordance with the standard notched Izod impact test as set forth in ASTM D256–47T. The results are as follows:

Table III

| Styrene/Butadiene Resin Ratio | Percent of total styrene converted to polystyrene | Notched Izod Impact, ft./lbs. per inch of Notch of 75/25 resin/rubber blend |
|---|---|---|
| 95/5 | 100 | 3.5 |
| 95/5 | 90 | 6.7 |
| 95/5 | 88.6 | 10.0 |
| 90/10 | 92 | 7.0 |
| 90/10 | 90 | 10.3 |
| 90/10 | 87 | 10.3 |
| 90/10 | 80 | 11.7 |

From this table of notched Izod impact values it is to be observed that when more than 90% of the styrene content of the resin is preconverted before the butadiene is polymerized, the impact strength of a 75/25 resin/rubber blend is impaired. The same sort of impairment is also observed with regard to the other styrene/butadiene resins having varying amounts of styrene/butadiene ratios ranging from 90/10 down to 55/45.

The same sort of loss of impact strength is also observed in regard to the 75/25 styrene/butadiene resin when tested alone in an uncured state. The following table IV of data was obtained on a 75/25 styrene/butadiene resin by forming bars of the resin and testing these bars in accordance with the notched Izod impact specification set forth by ASTM indicated above:

Table IV

| Styrene/Butadiene Resin Ratio | Percent of total styrene converted to polystyrene | Notched Izod impact, ft./lbs. per inch of notch of final resin |
|---|---|---|
| 75/25 | 100 | 2.2 |
| 75/25 | 96 | 6.5 |
| 75/25 | 95 | 6.6 |
| 75/25 | 93 | 7.5 |
| 75/25 | 87.5 | 10.5 |
| 75/25 | 87 | 11.1 |
| 75/25 | 86.5 | 12.1 |

The degree of polymerization of the total styrene component of the resin measured by either parts or by percent is determined by drawing off a sample of the styrene latex at a point, for example, where it is believed that at least 40 parts of the total styrene has been converted to polystyrene, which may be four hours after the start of the polymerization. The sample is weighed and then heated to drive off all volatile matter and the residue is then weighed. The weight of the solids remaining is then divided by the theoretical weight of the solids for 100% conversion and this result when multiplied by 100 gives the percent conversion of the styrene to polystyrene. The volatiles are generally driven off at a temperature of about 220° F.

The preconversion resins of this invention find new uses because of their relatively high heat distortion points and because of their relatively high Izod impact strengths. Also, the preconversion resin of this invention may be used either alone as thermoplastic compositions which may be re-used and re-formed without loss of impact strength, or may be blended in a cured stock with a rubber to produce desirable impact stocks for various uses, particularly for use in football helmets, football shoulder pads, plastic pipe, rigid sheets, television masks, and golf club heads.

While certain representative embodiments and details have been shown for the purpose of illustrating the invention, it will be apparent to those skilled in this art that various changes and modifications may be made therein without departing from the spirit or scope of the invention.

This is a continuation-in-part application of our application Serial Number 414,386 filed March 5, 1954, now abandoned.

We claim:

1. A tough, readily moldable thermoplastic resin having a heat distortion point of at least 170° F. comprising the polymerizate resulting from the aqueous emulsion polymerization of a mixture consisting of styrene monomer and butadiene monomer in the presence of a latex of polystyrene resulting from the aqueous emulsion polymerization of at least 40 parts by weight and not more than 90% by weight of the total styrene monomer used in preparing said resin, the total butadiene monomer and styrene monomer used ranging in proportion of styrene monomer to butadiene monomer of from 70/30 to 95/5.

2. A tough, readily moldable thermoplastic resin having a heat distortion point of at least 170° F. comprising the polymerizate resulting from the aqueous emulsion polymerization of a mixture consisting of butadiene in the presence of a latex of polystyrene prepared by polymerizing 40 to 81 parts by weight of the total styrene used in preparing said resin in aqueous emulsion, the ratio of styrene to butadiene used in preparing said resin being 90/10.

3. A tough, readily moldable thermoplastic resin having a heat distortion point of at least 170° F. comprising the polymerizate resulting from the aqueous emulsion polymerization of a mixture consisting of butadiene in the presence of a latex of polystyrene prepared by polymerizing 40 to 85.5 parts by weight of the total styrene used in preparing said resin in aqueous emulsion, the ratio of styrene to butadiene used in preparing said resin being 95/5.

4. A tough, readily moldable thermoplastic resin having a heat distortion point of at least 170° F. comprising the polymerizate resulting from the aqueous emulsion polymerization of a mixture consisting of butadiene in the presence of a latex of polystyrene prepared by polymerizing 40 to 76.5 parts by weight of the total styrene used in preparing said resin in aqueous emulsion, the ratio of styrene to butadiene used in preparing said resin being 85/15.

5. A tough, readily moldable thermoplastic resin having a heat distortion point of at least 170° F. comprising the polymerizate resulting from the aqueous emulsion polymerization of a mixture consisting of butadiene in the presence of a latex of polystyrene prepared by polymerizing 40 to 72 parts by weight of the total styrene used in preparing said resin in aqueous emulsion, the ratio of styrene to butadiene used in preparing said resin being 80/20.

6. A tough, readily moldable thermoplastic resin having a heat distortion point of at least 170° F. comprising the polymerizate resulting from the aqueous emulsion polymerization of a mixture consisting of butadiene in the presence of a latex of polystyrene prepared by polymerizing 40 to 67.5 parts by weight of the total styrene used in preparing said resin in aqueous emulsion, the ratio of styrene to butadiene used in preparing said resin being 75/25.

References Cited in the file of this patent

UNITED STATES PATENTS

| | | |
|---|---|---|
| 1,938,730 | Tschunkur et al. | Dec. 12, 1933 |
| 2,388,685 | Guss et al. | Nov. 13, 1945 |
| 2,414,803 | D'Alelio | Jan. 28, 1947 |
| 2,460,300 | Le Fevre et al. | Feb. 1, 1949 |
| 2,504,136 | Lee | Apr. 18, 1950 |
| 2,614,089 | Harrison et al. | Oct. 14, 1952 |

FOREIGN PATENTS

| | | |
|---|---|---|
| 679,562 | Great Britain | Sept. 17, 1952 |